United States Patent
Nozaki

(10) Patent No.: US 6,644,718 B2
(45) Date of Patent: Nov. 11, 2003

(54) STRUCTURE OF ROOF-SIDE PORTION OF MOTOR VEHICLE

(75) Inventor: Masahiro Nozaki, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/214,099

(22) Filed: Aug. 8, 2002

(65) Prior Publication Data

US 2003/0042755 A1 Mar. 6, 2003

(30) Foreign Application Priority Data

Aug. 9, 2001 (JP) ....................... 2001-242200

(51) Int. Cl.⁷ ............................... B60R 13/06
(52) U.S. Cl. .............. 296/146.9; 296/93; 49/483.1; 49/489.1
(58) Field of Search ............ 296/146.9, 206, 296/93, 146.2, 146.3; 49/475.1, 483.1, 489.1, 492.1

(56) References Cited

U.S. PATENT DOCUMENTS

| | | | | |
|---|---|---|---|---|
| 4,266,824 A | * | 5/1981 | Inamoto | 296/210 |
| 5,050,349 A | * | 9/1991 | Goto et al. | 49/489.1 |
| 5,356,194 A | * | 10/1994 | Takeuchi | 296/146.9 |
| 5,527,583 A | | 6/1996 | Nozaki et al. | |
| 5,590,926 A | | 1/1997 | Nozaki | |
| 5,791,722 A | | 8/1998 | Nozaki et al. | |
| 5,806,914 A | | 9/1998 | Okada | |
| 5,852,898 A | | 12/1998 | Hikosaka et al. | |
| 5,950,366 A | * | 9/1999 | Uhlmeyer | 49/484.1 |

FOREIGN PATENT DOCUMENTS

| | | | | | |
|---|---|---|---|---|---|
| JP | 60-104435 A | * | 6/1985 | | 296/146.3 |
| JP | 2-216318 A | * | 8/1990 | | 296/146.9 |
| JP | 5-16672 A | * | 1/1993 | | 296/146.9 |
| JP | 59-73339 A | * | 4/1994 | | 296/206 |
| JP | 6-106993 A | * | 4/1994 | | 296/146.9 |
| JP | 6-179324 A | * | 6/1994 | | 296/146.9 |
| JP | 07-291056 | | 11/1995 | | |
| JP | 08-132882 | | 5/1996 | | |

* cited by examiner

Primary Examiner—Joseph D. Pape
Assistant Examiner—Patricia Engle
(74) Attorney, Agent, or Firm—Posz & Bethards, PLC

(57) ABSTRACT

A structure of a roof-side portion of a motor vehicle has a roof-side garnish composed of a synthetic resin, which is attached to the roof-side portion including a front pillar. The garnish has a band-shaped main portion, and an attaching portion which protrudes inwardly from about a widthwise center of an inside surface of the main portion in a direction perpendicular thereto. The attaching portion is secured to a door-opening surface of the roof-side portion, which defines a door opening in a vehicle body, such that an upper part of the main portion covers a roof-side surface of the roof-side portion, and a lower part of the main portion extends downwardly of an outside end of the roof-side surface. A retainer is secured to the attaching portion of the garnish on the inner side of a closed door glass so as to face the lower part of the garnish through the closed door glass. And a roof-side weather strip is fitted between the lower part of the garnish and the retainer, and bonded to the attaching portion of the garnish in the position between the main portion of the garnish and the retainer.

8 Claims, 2 Drawing Sheets

STRUCTURE OF ROOF-SIDE PORTION OF MOTOR VEHICLE

CROSS-REFERENCE OF RELATED APPLICATION

This application is related to and claims priority from Japanese patent application No. 2001-242200, incorporated herein by reference.

BACKGROUND OF THE INVENTION

1. Field of the Invention

The present invention relates to a structure of a roof-side portion of a hardtop-type motor vehicle.

2. Description of Related Art

As shown in FIGS. 1 and 2, a roof-side portion 10 which includes a front pillar 12 has a door-opening surface 14 around a door opening 16 formed in a side body of a vehicle. A roof-side weather strip 18 is attached to the door-opening surface 14. When a vehicle door 20 is closed, a seal is formed between a door glass 22 in a fully closed position and the door-opening surface 14. In addition, a pillar weather strip 24 is attached to a center pillar to form a seal between a vertical edge of the door glass 22 and the center pillar. In the drawings, reference numeral 26 designates a window glass secured to a rear part of the side body.

Generally, mouldings are attached along the roof-side portion 10 to improve an appearance around the door opening 16. FIGS. 1 and 2 disclose one example of such mouldings. As shown, a moulding 28 is attached to the door-opening surface 14 which extends inwardly of a roof-side surface 32 of the roof-side portion 10, and the roof-side weather strip 18 is attached to the moulding 28.

The moulding 28 is composed of a glossy metal plate. A main portion 30 of the moulding 28 is arranged along a lower end of the roof-side surface 32 of the roof-side portion 10 so as to cover an outside surface of the roof-side weather strip 18. An inner portion 34 of the moulding 28 is placed under the door-opening surface 14 and is screwed thereto. A projection 36 is formed along an end edge of the inner portion 34 of the moulding 28. The roof-side weather strip 18 is held in position by fitting the projection 36 of the moulding 28 in a groove 38 which is formed at about a widthwise center of the weather strip 18. The inner portion 34 of the moulding 28 serves as a retainer for attaching the roof-side weather strip 18 to the roof-side portion 10. The roof-side weather strip 18 thus arranged is bonded to the door-opening surface 14 on the inner side of the moulding 28 with a double-sided adhesive tape 42. In FIG. 2, reference numeral 44 designates an opening trim attached around the door opening 16.

The metal moulding 28 for attachment along the roof-side portion 10 has, however, problems that the configuration and dimensions thereof cannot be selected freely, and accordingly, the appearance around the roof-side portion 10 is not much improved with the metal moulding 28. In addition, the bending work of the metal moulding 28 is complicated. Under these circumstances, it has been demanded to provide a roof-side garnish having a width capable of covering an outside surfaces of both the roof-side weather strip 18 and the roof-side portion 10, which is readily produced and assembled, and ensures an improved appearance therearound.

Furthermore, the conventional structure of the roof-side portion using the mouldig 28 as a retainer, has the following problem. Namely, in some types of vehicles, the roof-side surface 32 of the front pillar 12 does not always have a constant height from an outside surface of the door glass 22 in the longitudinal direction thereof. In one example of such vehicles, as shown in FIG. 1, a lower end of the roof-side surface 32 of the front pillar 12 is flush with a rear upper end of a fender panel 40. With this arrangement, as shown by two-dot chain lines in FIG. 2, the roof-side surface 32 of the front pillar 12 gradually rises from the outside surface of the closed door glass 22 towards the lower end thereof. Consequently, the distance S1 between the roof-side surface 32 of the front pillar 12 and the outside surface of the closed door glass 22 enlarges, and a level difference S2 is formed between the main portion 30 of the moulding 28 and the roof-side surface 32 of the front pillar 12. This level difference degrades the appearance around the door opening 16, and, if this level difference is large, it may cause the generation of wind noise.

SUMMARY OF THE INVENTION

Accordingly, it is an object of the present invention to provide an improved structure of a roof-side portion of a motor vehicle, which ensures an improved appearance therearound, overcomes the conventional problems such as the level difference between a roof-side portion and a closed door glass, and exhibits good sealing properties between a roof-side weather strip and a door-opening surface of the roof-side portion.

A structure of a roof-side portion of a motor vehicle in accordance with the present invention includes a door-opening surface which defines a door opening in a side body of the motor vehicle, a roof-side surface which extends from the door-opening surface towards a roof of the motor vehicle, a roof-side weather strip which is attached to the door-opening surface, a roof-side garnish composed of a synthetic resin, which covers the roof-side surface and of which a lower part extends downwardly of an outside end of the door-opening surface, and a retainer which is attached to the door-opening surface inwardly of a door glass in a closed state so as to face the lower part of the roof-side garnish in a width direction of the vehicle body. The roof-side weather strip is attached along the door-opening surface between the retainer and the lower part of the garnish such that a base portion of the roof-side weather strip is bonded to the door-opening surface.

With the present invention thus arranged, the roof-side garnish composed of a synthetic resin is apart from the retainer, and accordingly, the roof-side garnish can be readily molded with freely selectable design and with good productivity. In particular, the synthetic resin garnish can be freely colored as required. The attached roof-side garnish covers the outside surfaces of both the roof-side portion and the roof-side weather strip in close contact therewith without any occurrence of level difference therein.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 3:
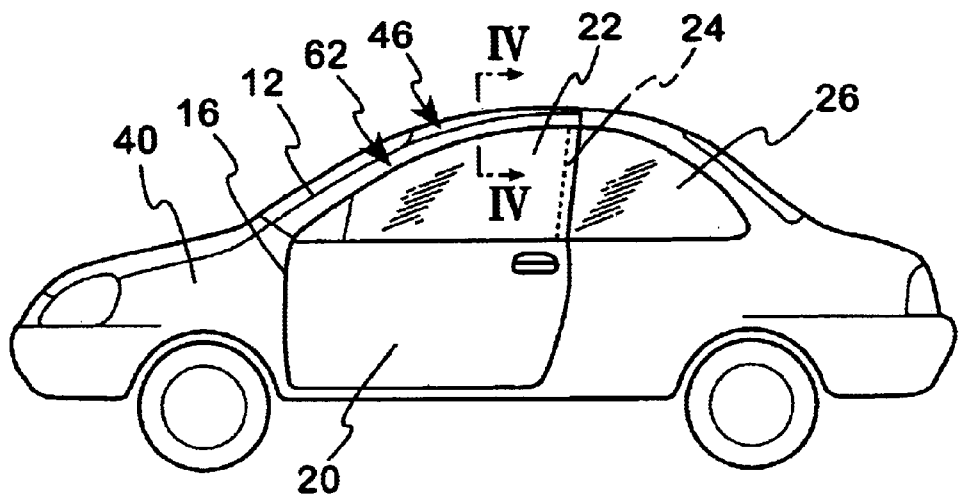
FIG. 3 is a side view of a motor vehicle which is provided with a roof-side garnish in accordance with the present invention.
Figure 4:
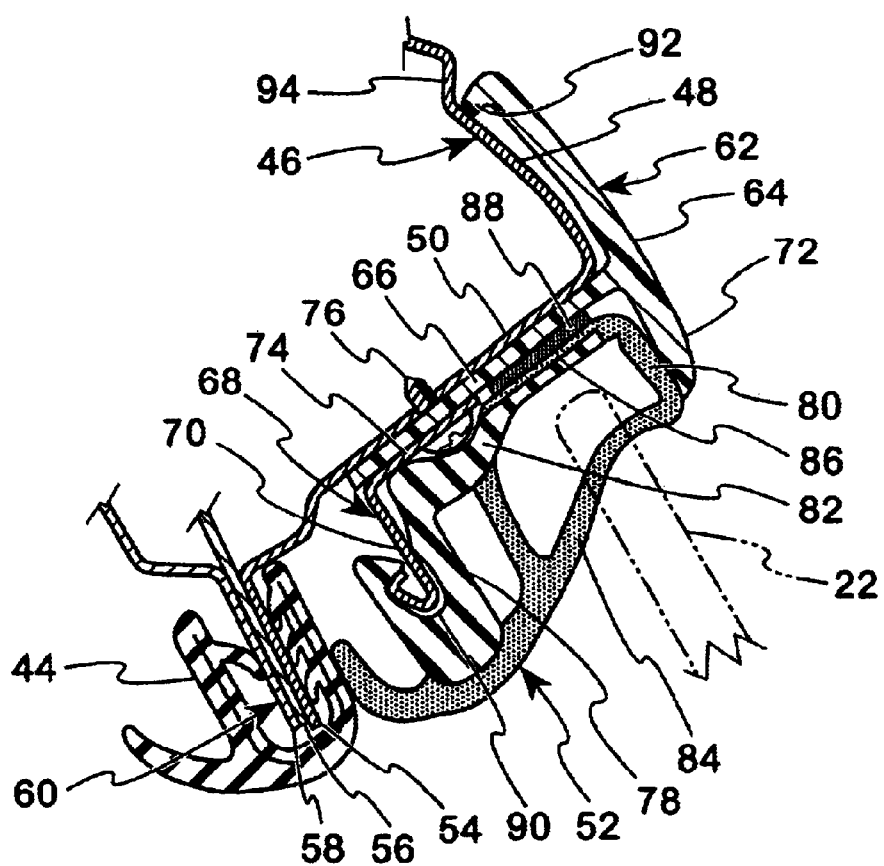
FIG. 4 is a cross-sectional view of a structure of a roof-side portion of the motor vehicle in accordance with the present invention, which is taken along the line IV—IV of FIG. 3.

As shown in FIG. 3, in a two-door hardtop-type motor vehicle, a roof-side portion 46 extends along a front pillar 12 and a side of a roof around a door opening 16. As shown in FIG. 4, the roof-side portion 46 includes a roof-side surface 48, and a door-opening surface 50 for attaching a roof-side weather strip (hereinafter will be referred to as "weather strip") 52. The roof-side surface 48 and the door-opening surface 50 are integrally composed of an outer body panel. An end edge 54 of the outer body panel, an end edge 56 of a reinforcing panel, and an end edge 58 of an inner body panel are joined together to form a flange 60. A trim 44 is fitted onto the flange 60.

A lower end of the roof-side portion 46 of the front pillar 12 faces a rear upper end of a fender panel 40 (FIG. 3) such that outside surfaces thereof are flush with each other. The roof-side surface 48 of the roof-side portion 46 of the front pillar 12 gradually rises from an outside surface of a door glass 22 in a closed state.

A band-shaped roof-side garnish (hereinafter will be referred to as "garnish") 62 is attached along the roof-side portion 46. The garnish 62 has such a width as to cover the roof-side surface 48 of the roof-side portion 46 and extend downwardly of an outside end of the door-opening surface 50. The garnish 62 is composed of a synthetic resin such as ABS resin and polypropylene, and is formed by injection molding. The garnish 62 includes a main portion 64 and an attaching portion 66 which protrudes inwardly from an inside surface of the main portion 64 in a direction approximately perpendicular thereto. The attaching portion 66 of the garnish 62 is placed under the door-opening surface 50.

A retainer 68 is secured to the attaching portion 66 of the garnish 62 on the inner side of a periphery of the closed door glass 22. The retainer 68 is composed of a metal plate having an approximately L-shaped cross-section. A vertical part 70 of the retainer 68 faces a lower part 72 of the garnish 62, which extends downwardly of the door-opening surface 50, through the periphery of the closed door glass 22 in a width direction of a vehicle body. A transverse part 74 of the retainer 68 is placed under the attaching portion 66 of the garnish 62, and is screwed to the door-opening surface 50 integrally with the attaching portion 66 of the garnish 62.

Upon assembling the garnish 62 and the retainer 68 around the door opening 16, the transverse part 74 of the retainer 68 is previously placed under the attaching portion 66 of the garnish 62, and provisionally secured thereto with clips or the like. Then, the garnish 62 is positioned such that the main portion 64 of the garnish 62 extends along the roof-side surface 48, and the attaching portion 66 thereof extends along the door-opening surface 50. Then, the transverse part 74 of the retainer 68 and the attaching portion 66 of the garnish 62 are integrally secured to the door-opening surface 50 with tapping screws 76 at predetermined intervals.

The attaching position of the vertical part 70 of the retainer 68 is determined such that the distance between the vertical part 70 and the periphery of the closed door glass 22 is constant over the entire length of the retainer 68. An end of the transverse part 74 is located in about the middle between the vertical part 70 of the retainer 68 and the lower part 72 of the garnish 62 so as to be apart from the main portion 64 thereof. The retainer 68 has a constant width over an entire length thereof. As the roof-side surface 48 of the front pillar 12 gradually rises in a direction of the fender panel 40, and the distance between the roof-side surface 48 of the roof-side portion 46 and the periphery of the closed door glass 22 gradually enlarges, the distance between the main portion 64 of the garnish 62 and the transverse part 74 of the retainer 68 gradually enlarges frontwardly, and consequently, the distance between the lower part 72 of the garnish 62 and the vertical part 70 of the retainer 68 gradually enlarges frontwardly.

The weather strip 52 is fitted between the lower part 72 of the garnish 62 and the vertical part 70 of the retainer 68. The weather strip 52 is composed of an extruded tubular body, and includes an inner wall 78 for attachment along the vertical part 70 of the retainer 68, an outer wall 80 for contacting and pressing an inside surface of the lower part 72 of the garnish 62, a base portion 82 for attachment to the door-opening surface 50, and a seal wall 84 for connecting end edges of the inner wall 78 and the outer wall 80. The inner wall 78 and the base portion 82 are composed of a solid rubber. The outer wall 80 and the seal wall 84 are composed of a sponge rubber. A sponge layer 86 is additionally formed in an upper surface of the base portion 82, which faces the attaching portion 66 of the garnish 62, for improving the bonding properties with a later-describing double-sided adhesive tape 88.

The weather strip 52 is formed to have a width slightly greater than the maximum distance between the lower part 72 of the garnish 62 and the vertical part 70 of the retainer 68, which is at a lower end of the roof-side surface 48 of the front pillar 12. The weather strip 52 thus arranged is held in position by pushing the weather strip 52 into a space between the vertical part 70 of the retainer 68 and the lower part 72 of the garnish 62 with a compression force applied thereto in a width direction of a vehicle body, and fitting a groove 90 formed in the inner wall 78 of the weather strip 52 onto a projecting end of the vertical part 70 of the retainer 68. The double-sided adhesive tape 88 is bonded to the sponge layer 86 which is located between the transverse part 74 of the retainer 68 and the main portion 64 of the garnish 62. Upon attaching the weather strip 52, the double-sided adhesive tape 88 is bonded to the attaching portion 66 of the garnish 62. Thus, the weather strip 52 is attached along the door-opening surface 50 sequentially in a longitudinal direction thereof. The outer wall 80 of the weather strip 52 contacts and presses the inside surface of the lower part 72 of the garnish 62 so as to be covered therewith.

The garnish 62 covers approximately the entire outside surface of the front pillar 12. On the other hand, along the side of a roof of the motor vehicle, a projection 92, which projects from an upper edge of the garnish 62, abuts a step 94, which is formed in the outer body panel.

In the structure thus arranged, the conventional metal moulding is replaced with the garnish 62 composed of a synthetic resin. By selecting the width and the color of the synthetic resin, the design around the roof-side portion 46 can be selected freely, and accordingly, the appearance therearound can be remarkably improved.

With the structure in accordance with the present invention, the garnish 62 for covering the roof-side portion 46 is prepared separately from the retainer 68 for positioning the weather strip 52, and upon attachment, the retainer 68 is arranged apart from the main portion 64 of the garnish 62 in a width direction of a vehicle body, and the weather strip 52 is held between the retainer 68 and the garnish 62 with a compressing force applied thereto in the width direction thereof. Accordingly, where the roof-side portion 46 locally rises from the closed door glass 22 to vary the distance between the retainer 68 and the garnish 62, this variation can be absorbed with the deformation of the weather strip 52.

The retainer 68 is only used to hold the inner wall 78 of the weather strip 52, and accordingly, a small-sized retainer will do. Since the weather strip 52 is bonded with a double-sided adhesive tape 88 using the space between the main portion 64 of the garnish 62 and the retainer 68, a good seal is formed between the weather strip 52 and the door-opening surface 50, thereby preventing water leakage into an interior of a vehicle body.

The above-described structure is also used to attach the garnish to a roof-side portion of four door-type motor vehicles. In four door-type motor vehicles, the garnish is extended to a roof-side portion in a rear body thereof.

Figure 1:
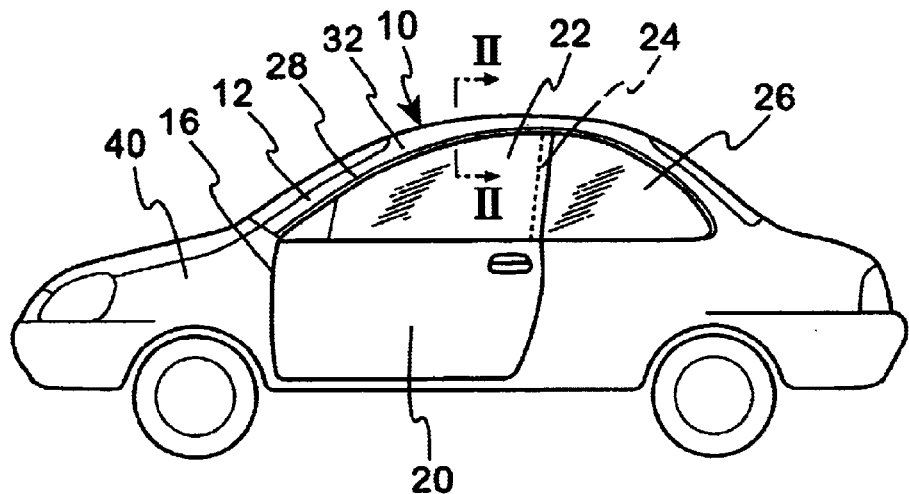
FIG. 1 is a side view of a conventional motor vehicle.
Figure 2:
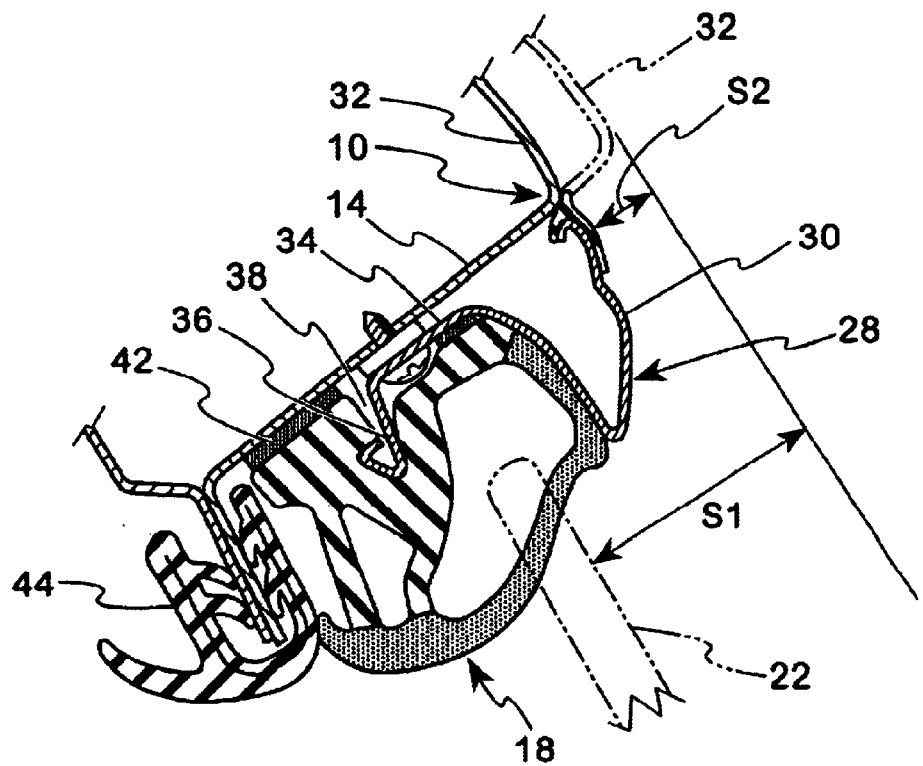
FIG. 2 is a cross-sectional view of a conventional structure of a roof-side portion, which is taken along the line II—II of FIG. 1.

With the present invention, the design of the roof-side portion of a vehicle body can be freely selected by virtue of the synthetic resin garnish. In addition, a small sized retainer will do for holding the weather strip in position. Where the distance between the roof-side surface of the roof-side portion and the periphery of the closed door glass locally varies, such a level difference S2 (FIG. 2) as encountered with the conventional structure is not produced. Since the outer wall of the weather strip is pushed by the lower part of the garnish, and the base portion thereof is bonded to the attaching portion of the garnish on the outer side of the retainer, good sealing properties between the weather strip and the door-opening surface of the vehicle body can be effected.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A structure of a roof-side portion of a motor vehicle, which extends along a side of a roof thereof, and a front pillar, comprising:
    a door-opening surface which defines a door opening in a side body of the motor vehicle;
    a roof-side surface which extends from said door-opening surface towards the roof of the motor vehicle;
    a roof-side weather strip for forming a seal between said door-opening surface and a closed door glass;
    a roof-side garnish composed of a synthetic resin, wherein a width dimension of the roof-side garnish is such that the roof-side garnish covers said roof-side surface, and a lower part of the roof-side garnish extends downwardly with respect to an outside end of said door-opening surface, and said roof-side garnish has an attaching portion, which is attached to said door-opening surface; and
    a retainer composed of a metal, which faces said lower part of said roof-side garnish in a lateral direction of the motor vehicle, said retainer being attached to said door-opening surface on the inner side of the closed door glass, said roof-side weather strip being attached between said retainer and said lower part of said garnish such that a base portion of said roof-side weather strip is bonded to said attaching portion of said garnish.

2. A structure of a door opening portion of a motor vehicle as claimed in claim 1, wherein said retainer has a width that is approximately constant over the entire length of said retainer, and said retainer is attached to said door-opening surface so as to face a periphery of said closed door glass with a constant space over the entire length of said retainer.

3. A structure of a door opening portion of a motor vehicle as claimed in claim 1, wherein said retainer is composed of a plate-like body having an approximately L-like cross-section, and a transverse part of said retainer is secured to said door-opening surface, while a vertical part of said retainer is located a constant distance from said closed door glass over the entire length of said retainer, and said retainer faces said lower part of said garnish in a lateral direction of said vehicle body through said closed door glass.

4. A structure of a door opening portion of a motor vehicle as claimed in claim 3, wherein said roof-side weather strip is composed of an extruded tubular body, and includes a base portion, an inner wall and an outer wall, which respectively extend from an inner end and an outer end of said base portion, and a seal wall, which connects ends of said inner wall and said outer wall, wherein said seal wall is adapted to be pushed by said door glass when elevated into its fully closed position, said base portion and said inner wall are composed of a solid rubber material, said outer wall and said seal wall are composed of a sponge rubber material, and said roof-side weather strip is attached between said vertical part of said retainer and said lower part of said garnish with said inner wall held in position by said vertical part of said retainer, and with said outer wall compressed by said lower part of said garnish in a lateral direction of said vehicle body.

5. A structure of a door opening portion of a motor vehicle as claimed in claim 4, wherein said garnish includes a band-shaped main portion, and an attaching portion integrally formed with said main portion, said attaching portion protrudes inwardly from an inside surface of said main portion in a direction perpendicular to said inside surface of said main portion, an upper part of said main portion of said garnish covers said roof-side surface of said vehicle body, said attaching portion is placed under said door-opening surface, said transverse part of said retainer is placed under said attaching portion of said garnish on the inner side of said closed door glass, said attaching portion of said garnish and said retainer are integrally secured to said door-opening surface, said roof-side weather strip is fitted between said vertical part of said retainer and said lower part of said garnish, and said base portion is bonded to said attaching portion of said garnish in a position between said retainer and said main portion of said garnish.

6. A structure of a door opening portion of a motor vehicle as claimed in claim 1, wherein:
    said garnish includes a band-shaped main portion which extend along said roof-side surface;
    said attaching portion is integrally formed with said main portion and protrudes inwardly from an inside surface of said main portion in a direction perpendicular to said inside surface of said main portion;
    an upper part of said main portion of said garnish covers said roof-side surface of said vehicle body;
    said attaching portion is placed under said door-opening surface thereof, and secured to said door-opening surface;
    said roof-side weather strip is fitted between said retainer and said lower part of said garnish; and
    said base portion of said roof-side weather strip is bonded to said attaching portion of said garnish in a position between said retainer and said main portion of said garnish.

7. A structure of a door opening portion of a motor vehicle as claimed in claim 1, wherein:
   a transverse part of said retainer is placed under said attaching portion of said garnish on the inner side of said closed door glass;
   said attaching portion of said garnish and said retainer are integrally secured to said door-opening surface;
   said roof-side weather strip is fitted between a vertical part of said retainer and said lower part of said garnish; and
   said base portion of said roof-side weather strip is bonded to said attaching portion of said garnish in a position between said retainer and said main portion of said garnish.

8. A doorway structure of a motor vehicle body, wherein the doorway structure extends along a side of a roof and along a front pillar, the structure comprising:
   a door-opening surface, which defines a door opening in a body of the motor vehicle;
   a roof-side surface, which extends from the door-opening surface towards the roof of the motor vehicle;
   a weather strip, which is attached to the door-opening surface and forms a seal between the door-opening surface and a door glass;
   a garnish, which is a unitary part made of a synthetic resin, wherein the garnish has an outer member, and the outer member includes an upper part, which overlaps the roof-side surface, and a lower part, which extends downwardly with respect to an outside end of the door-opening surface, and the upper part is substantially coplanar with the lower part, and the garnish has an attaching portion that extends from the outer member, and the attaching portion is attached to the door-opening surface, and the attaching portion is generally perpendicular to the outer member; and
   a metal retainer, which faces the lower part of the garnish in a lateral direction of the motor vehicle, wherein the retainer is attached to the door-opening surface on the inner side of a the door glass, and the weather strip is held between the retainer and the lower part of the garnish, and a base portion of the weather strip is bonded to the attaching portion.

* * * * *